US008050496B2

(12) United States Patent
Pan et al.

(10) Patent No.: US 8,050,496 B2
(45) Date of Patent: Nov. 1, 2011

(54) COLOR GAMUT MAPPING/ENHANCEMENT TECHNIQUE USING SKIN COLOR DETECTION

(75) Inventors: Hao Pan, Camas, WA (US); Scott J. Daly, Kalama, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1023 days.

(21) Appl. No.: 11/895,854

(22) Filed: Aug. 27, 2007

(65) Prior Publication Data

US 2008/0166044 A1    Jul. 10, 2008

(51) Int. Cl.
*G06K 9/00* (2006.01)
*G06K 9/40* (2006.01)
*G06K 9/34* (2006.01)

(52) U.S. Cl. .................... 382/167; 382/118; 382/260

(58) Field of Classification Search ............. 382/118, 382/162, 164, 165, 167, 190, 224, 254, 260–264; 345/589–591, 600–604; 358/512, 518, 520, 358/523, 525, 530
See application file for complete search history.

(56) References Cited

U.S. PATENT DOCUMENTS

| | | | | |
|---|---|---|---|---|
| 6,148,092 A * | 11/2000 | Qian | ............................ | 382/118 |
| 6,275,614 B1 * | 8/2001 | Krishnamurthy et al. | .... | 382/224 |
| 6,631,206 B1 * | 10/2003 | Cheng et al. | ................. | 382/164 |
| 6,646,762 B1 * | 11/2003 | Balasubramanian et al. | . | 358/1.9 |
| 6,859,210 B2 * | 2/2005 | Luo et al. | ...................... | 345/589 |
| 7,054,032 B2 * | 5/2006 | Kato | .............................. | 358/1.9 |
| 7,853,094 B2 * | 12/2010 | Pan et al. | ...................... | 382/254 |
| 7,903,166 B2 * | 3/2011 | Daly | ........................ | 348/333.12 |
| 2004/0208363 A1 | 10/2004 | Berge et al. | | |
| 2005/0117798 A1 | 6/2005 | Patton et al. | | |
| 2005/0195212 A1 | 9/2005 | Kurumisawa et al. | | |
| 2005/0232482 A1 | 10/2005 | Ikeda et al. | | |
| 2005/0244053 A1 | 11/2005 | Hayaishi | | |
| 2007/0043527 A1 * | 2/2007 | Quan et al. | .................... | 702/104 |
| 2007/0171443 A1 * | 7/2007 | Pan | ................................ | 358/1.9 |
| 2008/0166042 A1 * | 7/2008 | Pan et al. | ..................... | 382/164 |
| 2008/0166044 A1 * | 7/2008 | Pan et al. | ..................... | 382/167 |
| 2010/0194773 A1 * | 8/2010 | Pan et al. | ..................... | 345/590 |

FOREIGN PATENT DOCUMENTS

WO    WO 02/099557    12/2002

* cited by examiner

*Primary Examiner* — Amir Alavi

(74) *Attorney, Agent, or Firm* — Chernoff Vilhauer McClung & Stenzel LLP

(57) ABSTRACT

A method for mapping/enhancing the color of an image to be displayed on a display includes receiving an image having a plurality of pixels where each of the pixels has a plurality of color components. The image is processed using a pair of gamut color mapping operations in combination with skintone pixels detection to modify the image in a suitable manner for presentation on the display, wherein the technique includes color temperature compensation.

36 Claims, 12 Drawing Sheets

| TabCntrlPnt | 46 | 88 | 132 | 164 | 200 | 232 |
|---|---|---|---|---|---|---|
| Red | 782 | 1475 | 2180 | 2697 | 3256 | 3712 |
| Green | 701 | 1340 | 2011 | 2498 | 3047 | 3534 |
| Blue | 620 | 1186 | 1796 | 2250 | 2783 | 3330 |

An example CTA LUT

FIG. 15

| $R_{out}$ | 782 | 1475 | 2180 | 2697 | 3256 | 3712 |
|---|---|---|---|---|---|---|
| $h_R$ | 17 | 16.7614 | 16.5152 | 16.4451 | 16.28 | 16 |

The $h_R$ LUT calculated from red CTA LUT shown in Table 1

FIG. 16

COLOR GAMUT MAPPING/ENHANCEMENT TECHNIQUE USING SKIN COLOR DETECTION

BACKGROUND OF THE INVENTION

The present invention relates to display color gamut mapping and image color enhancement.

The advance of flat panel display (FPD) technology is able to make the color gamut of a display wider than the sRGB/ITU-R BT.709 color gamut that is widely used by the current HDTV and Internet/computers standards. A color gamut mapping algorithm (GMA) maps RGB (red, blue, green) display values of a color in a color gamut to new RGB values in a new gamut. The RGB display values before and after a GMA usually are different, and may or may not represent the same physical color. The input of a GMA is also 3 dimensional and the output of a GMA is also 3 dimensional.

An image color enhancement algorithm maps color of an image to new more saturated colors. Image color enhancement is also a three dimensional mapping technique. The input of color enhancement is 3 dimensional and the output is 3 dimensional. Most existing current image color enhancement techniques typically boost saturation of colors. In the hue-saturation color wheel such as the one shown in FIG. 1, a typical color enhancement technique moves colors outward on the radial direction as shown by the arrows. A GMA from small gamut to big gamut also typically boosts saturation of colors. Therefore, a GMA from small gamut to big gamut and an image color enhancement algorithm have similar challenges.

By way of example, televisions have built-in color enhancement techniques to enhance unsaturated colors in certain content and let viewers set their color preferences. Because the human eye is very sensitive to the skin color, it is desirable for a color enhancement technique to render skin colors properly. It is also desirable for a color enhancement technique to separately adjust skin colors and non-skin colors using different characteristics.

Some GMA color enhancement techniques have the capability of protecting skin colors. These techniques are typically pixel-based. When the color of a pixel is mapped/enhanced to a new color, the conversion from the old color to the new color is fixed, and is not affected by other pixels. Because pixel-based color enhancement techniques with skin color protection cannot overcome the issue that the colors of skin and non-skin are highly overlapped, these techniques cannot effectively protect skin tones to maintain their calibration with the input image.

BRIEF DESCRIPTION OF THE SEVERAL VIEWS OF THE DRAWINGS

FIG. 15 illustrates a color temperature adjustment look up table.

FIG. 16 illustrates a look up table calculated from the red color temperature adjustment look up table.

DETAILED DESCRIPTION OF PREFERRED EMBODIMENT

Figure 1:
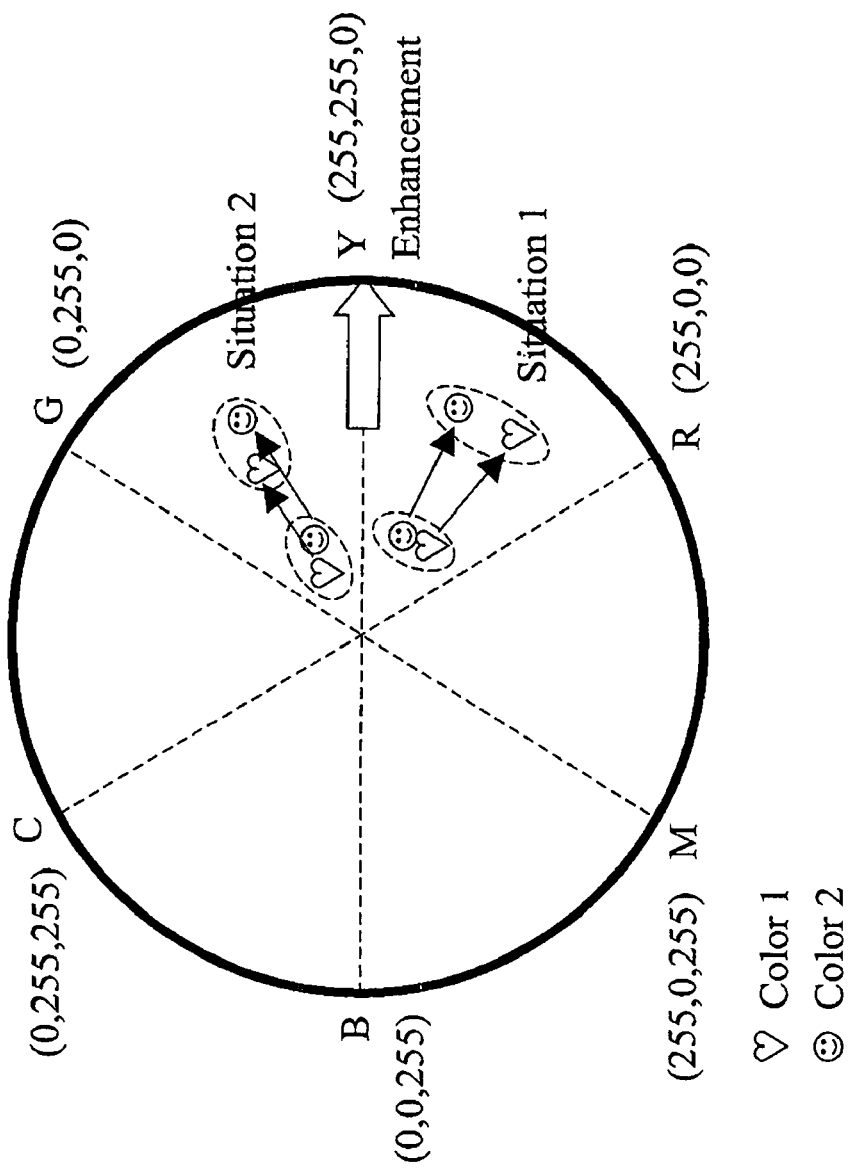
FIG. 1 illustrates two adjacent colors in the hue-saturation color wheel that are not adjacent in the wheel after color enhancement.
Figure 2:
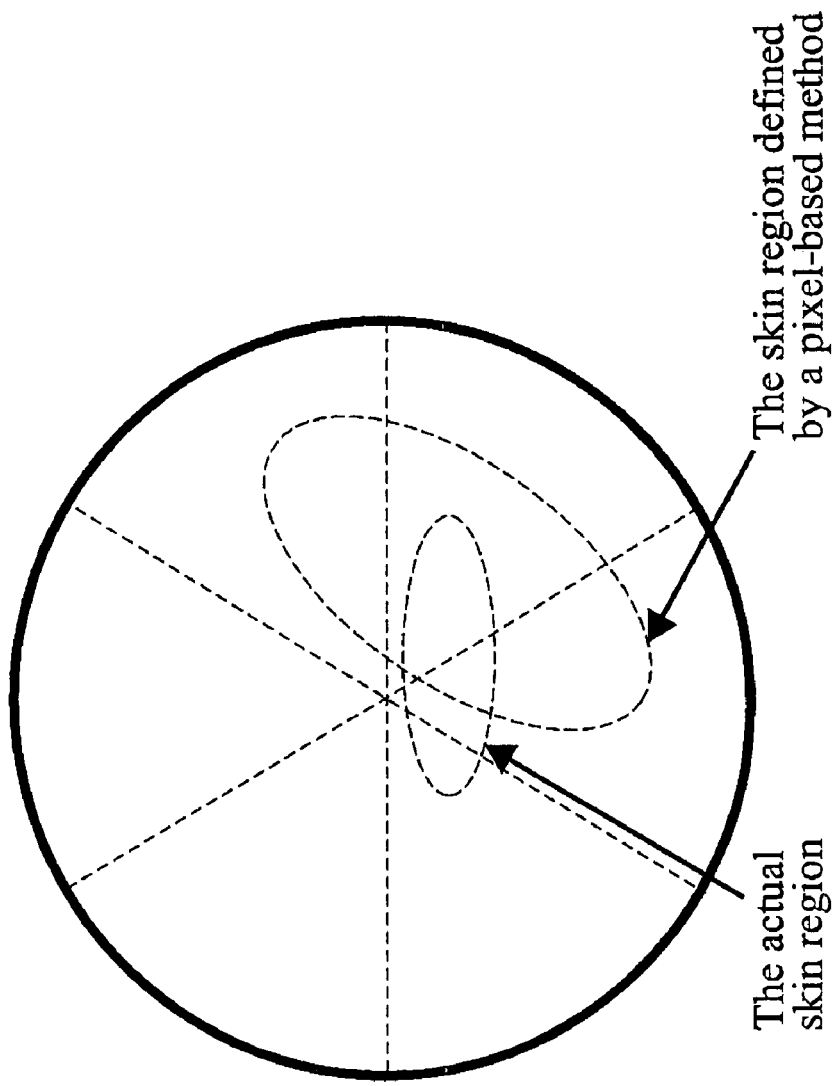
FIG. 2 illustrates the actual skin color region and the skin region defined by a pixel based technique in a color wheel.

An observation was made that a typical pixel based GMA/color enhancement technique results in two similar pixel colors before mapping enhancement being modified to different values that are significantly less similar after mapping enhancement. FIG. 1 illustrates two different situations of enhancement. Situation 1 illustrates the case when two pixel colors are similar in saturation but have different hues, and situation 2 illustrates the case when two colors have the same hue and similar saturations.

In both situations, the two pixel colors are close to each other in the color wheel before GMA/color enhancement. The two colors are spaced significantly apart from each other in the color wheel after color enhancement, indicating that the two enhanced colors are less similar after GMA/enhancement than they were before GMA/enhancement.

As a result, single pixel-based GMA/color enhancement techniques also enhance artifacts while it enhances colors. The pixels in spatial flat areas of the non-enhanced image tend to have similar colors, and the differences among the similar colors are not very visible to the viewer. Because the pixel-based GMA/color enhancement techniques enlarge the differences of similar colors, the resulting differences of the enhanced image may become very visible, and consequently a flat area of the image before GMA/enhancement may not be very flat anymore after GMA/enhancement. Specifically, pixel-based color GMA/enhancement techniques are prone to amplifying noise and structural artifacts, generally referred to as noise, that is otherwise generally unobservable in the flat area to become readily observable after color enhancement. Also, the pixel-based color GMA/enhancement technique tends to amplify and generate quantization artifacts in the smooth regions before GMA/enhancement that become relatively rough after GMA/enhancement. In addition, amplifying compression artifacts that are generally unobservable in the non-enhanced image become generally noticeable after GMA/enhancement. The compression artifacts include, for example, contours, which are typically due to insufficient bit-depth, blocky artifacts, which are common for block-based compression schemes, and ringing artifacts, which are due to loss of high frequency caused by compression.

The GMA/color enhancement technique results in an increased color saturation for an image, and as a result tends to increase the noise and artifacts that are in the image, which are often not observable before GMA/enhancement. Accordingly, it is desirable to reduce the generation of artifacts while enhancing the color of the image with an increased saturation. While decreasing the generation of artifacts in the image with increased saturation, the technique should also preserve image details which are generally high frequency in nature and akin to 'noise'.

A skin-cognizant GMA/color enhancement is a particular GMA/color enhancement that may include one or more of the following characteristics:

rendering skin colors faithfully;
utilizing the expanded color gamut for GMA and/or enhancing non-skin colors for color enhancement;
reducing the generation of contouring or other artifacts; and a flexible implementation.

To fulfill these characteristics, a skin-cognizant GMA/color enhancement technique may be based upon a pair (or more) of GMA/color enhancement algorithms. One conservative GMA/color enhancement algorithm (referred to herein as GMA0) may substantially reproduce the input physical colors, while the other aggressive GMA/color enhancement algorithm (referred to herein as GMA1) may utilize a greater extent of the expanded color gamut or aggressively enhance the input colors. Both of these GMAs are usually designed in such a manner that they operate independent of skin colors. In addition, a skin-cognizant operator may be used together with the pair of GMAs to produce a final mapping from one color space to another color space or enhancement while maintaining skin tones with a suitable set of colors.

Figure 3:
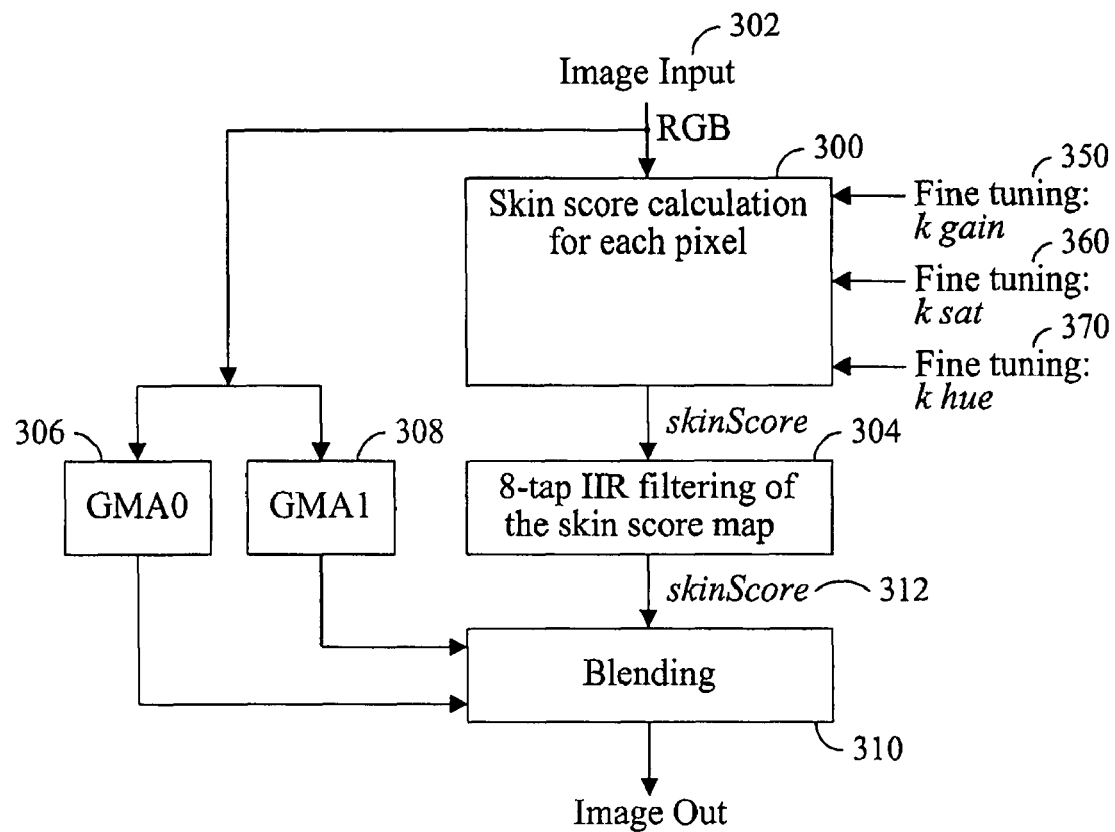
FIG. 3 illustrates a block diagram of the proposed technique.

The block diagram of a skin-cognizant GMA/color enhancement is shown in FIG. 3. First, the technique calculates a skin score 300 of the input color 302. Then, the skin score 300 is spatially filtered by an 8-tap IIR spatial filter 304 (for example) to reduce contouring artifacts. At the same time, the conservative GMA0 306 and aggressive GMA1 308 are computed. Finally, the outputs of the two GMAs 306 and 308 are blended 310 together in accordance with the output of the filtering 304 in a manner that protects the skin tones of the image (described in detail later).

To protect skin colors during blending 310, it is desirable to identify which color is the skin color. The system may assign a scalar between 0 and 1 to every color to give a "score" 312 on the likelihood this color is a skin color. This scalar value may be referred to herein as a "skin score". Specifically, for skin score, 0 is a confident non-skin color, 1 is a confident skin color, and larger than 0 and smaller than 1 indicates a range of skin color confidence.

There are two reasons it is preferable to use a non-binary skin score indicator. First, the skin and non-skin colors are highly overlapped, especially due to the effects of lighting. While some colors are more likely to be skin colors than other colors, there is not any devoted skin colors, so the best way to describe skin colors is a scalar. Second, a scalar provides a smooth transition from skin colors and non-skin colors in the color space to reduce generating contouring artifacts in the image.

Based on the skin score 312, in the skin-cognizant GMA, a mapped color is a blending of the colors mapped by two GMAs, namely, GMA0 306 and GMA1 308. GMA0 is a conservative GMA that substantially or exactly reproduces the input color space (such as sRGB skin tones) in the wider color gamut of the display and therefore acts to "protect" skin colors. GMA1 is an aggressive GMA1 that stretches the input color space of the input colors (such as sRGB non-skin tones) to the wide color gamut. Mathematically, the blending may be expressed as:

$$y=GMA(c)=\text{skinScore}(c)*GMA0(c)+(1-\text{skinScore}(c))*GMA1(c) \quad (1)$$

where skinScore (c) is the skin core of the input color c.

A linear mapping approach in GMA0 may be used to reproduce the sRGB color in the wide color gamut. Specifically, the input RGB may first go through sRGB gamma mapping to a linear luminance domain, multiplied by the 3×3 conversion matrix, and modified back from the linear domain to the non-linear domain by inverse sRGB gamma mapping. Note that if sRGB is not 100% inside the new wide color gamut, then negative components in the 3×3 conversion matrix may occur when the gamut is reduced relative to the code values.

GMA1 may be an advanced GMA that makes use of all or a substantial part of the expanded wide color gamut. The system may permit the input image to go through without any added processing, if desired. In this case, the wider color gamut of the more saturated primaries will stretch all colors processed by GMA1 to be more saturated. To further reduce the possible contouring artifacts happening, the system may spatially filter 304 the skin score of pixel with its neighbors. After this filtering, the skin score is not only smooth in the color space but also smoother spatially.

The skin score 312 may be adjusted by a set of factors. The skin score and skin color probability are preferably scalars between 0 and 1, and skin score is based on skin color probability, but the system should modify this value for a more accurate determination of the skin score. Other factors can be used to adjust the skin score.

The gain control may be determined by setting a scalar k_gain 350 between 0 and 1 to control the "gain" of skin score, according to the viewer preference and wide color gamut. Specifically, the system may modify skin score as:

$$\text{skinScore}_{new}=k\_gain*\text{skinScore} \quad 0\leq k\leq 1 \quad (2)$$

This skinScore$_{new}$ may be plugged into equation (1). The parameter k_gain is controlled by the viewers. If k_gain is set to 1, then skinScore$_{new}$=skinScore; if k is set to 0, then skinScore$_{new}$=0, and the result is the aggressive GMA y=GMA1 (c) for all pixels, since non are considered skin codes to be processed by GMA0.

One may modify a parameter to adjust the saturation of the skincolor region in the color space. One may set a scalar k_sat 360 between 0 and 2 to control the range of skin colors on the saturation axis. All the saturation values prior to sending to the skin score look up tables are first multiplied with k_sat. The default k_sat is 1. When k_sat is smaller than 1, the range of skin colors on the saturation axis is increased; when is bigger than 1, the range of skin colors on the saturation axis is reduced.

One may modify a parameter to adjust the hue of the skin color region in the color space. One may set a scalar k_hue 370 between 0 and 2 to control the range of skin colors on the saturation axis. All the hue values prior to sending to the skin score look up tables are first multiplied with k_hue. The default setting is 1. When k_hue is smaller than 1, the range of skin colors on the hue axis is increased; when is bigger than 1, the range of skin colors on the hue axis is reduced.

Figure 4:
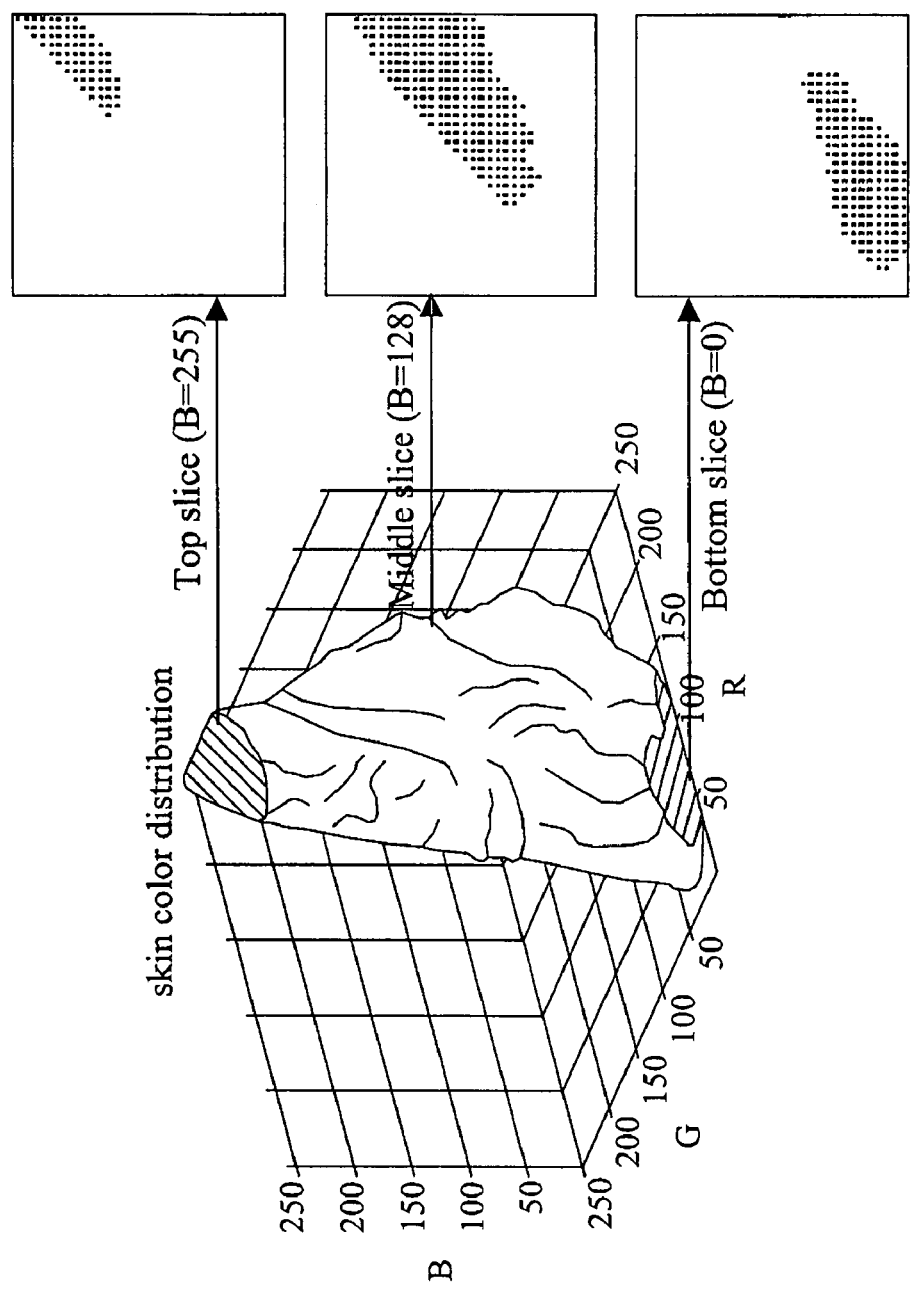
FIG. 4 illustrates a look up table of skin color.

A test set of skin color probability is shown in the FIG. 4 as a three dimensional plot of a 33×33×33 skin color lookup table (left) and three two dimensional slices of the three dimensional look up table with blue=0, 128, and 255, respectively (right). The skin color probability distribution provides baseline information for roughly deciding the location and size that the skin color region should be in the color space. From the skin color probability shown in FIG. 4, it may be observed that most skin colors are R>G>B or R>B>G, and those close to the neutral have higher probability. Therefore, skin score should be positive when R>G>B or R>B>G, and are bigger when a color is close to the neutral.

The skin score is also affected by the target wide color gamut. Because the skin and non-skin colors are highly overlapped, many colors are not either 100% skin colors or 100% non-skin color with skin score bigger than 0 and smaller than 1. Equation (1) shows that the skin-cognizant algorithm maps these colors as the mixture of GMA0 and GMA1 weighted by skin score 312. GMA0 is the sRGB reproduction in the new expanded color gamut, which is independent from the expanded color gamut once displayed. The GMA0 technique parameters, however, do depend on the color gamut primary values. GMA1 is dependent on the expanded color gamut. Therefore, if the system makes skin score 312 independent from the expanded wide color gamut, then the mapped colors code values change when the expanded wide color gamut changes. The measured colors on the display do not change. On the other hand, if the system wants the mapped skin colors to be relatively constant when the expanded wide color gamut changes, then the skin score may be adjusted according to different wide color gamuts.

Skin score may be adjustable to different viewer groups as well. Some viewer group prefers more saturated colors than the others and adjusting skin score can fulfill this preference. The skin score is the function of RGB. Therefore, the form of this function may be chosen to make the skin score easily adjustable on the wide color gamut and viewer preference.

Skin score may be stored and calculated by a look-table (LUT) in the skin-cognizant algorithm. If the system directly uses RGB color space, the LUT would be 3 dimensional. It is complex to make a 3D LUT adjustable, and therefore 3D LUT is problematic to use for the adjustability that the may be desired in the skin scores. Therefore, the system may directly use RGB color space and the 3D LUT is not highly desirable.

To simplify the determination, the skin score conceptually may be modeled in a modified HSV color space. Then one 3D LUT could be replaced by three 2D LUTs and two 1D LUTs. Several smaller 2D LUTs and 1D LUTs are easier to adjust than one big 3D LUT.

Figure 5:
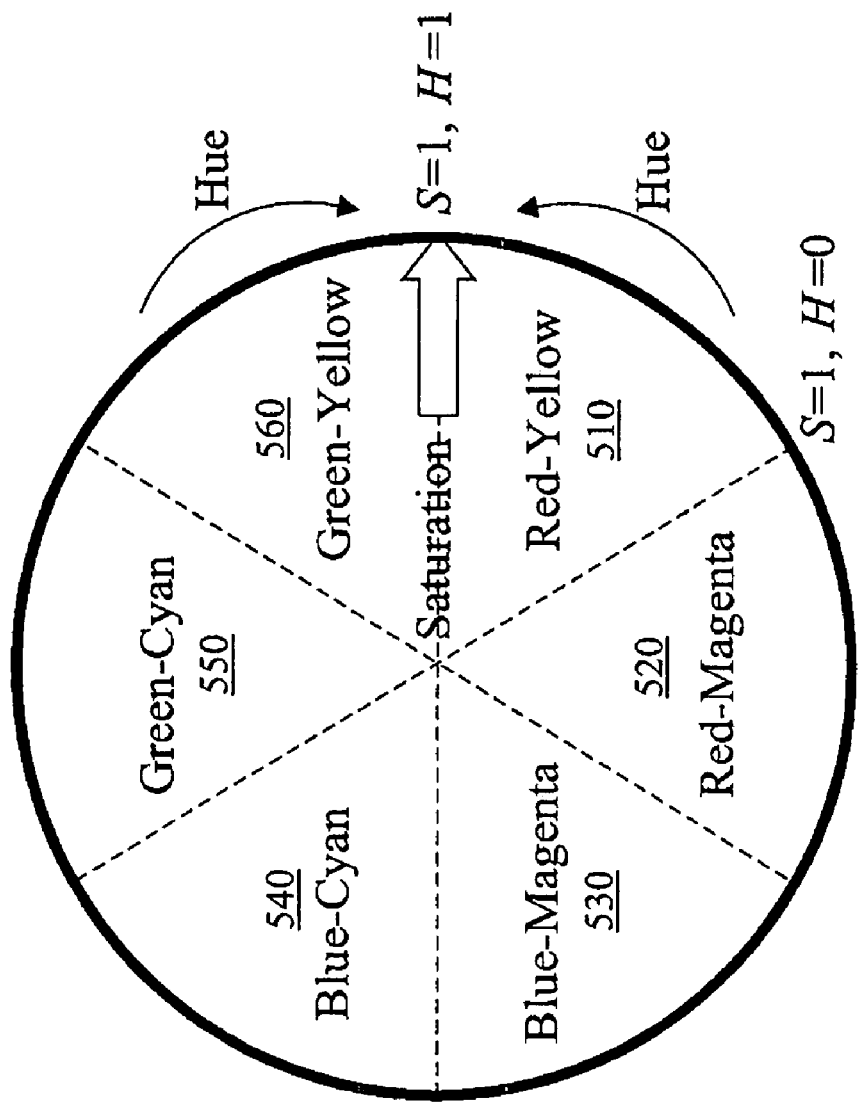
FIG. 5 illustrates a color wheel.

First the system divides the RGB color space into six areas, then defines hue (H), saturation (S) and value (V) separately in the six areas (note that while S and V are the standard definition, H is different), and finally the system defines the skin score for each area. First the red-yellow area is discussed in detail and then the remaining five areas. The six color areas and S and H are illustrated in FIG. 5.

All the colors in the red-yellow area 510 are either reddish or yellowish. The saturation, hue and value are defined as:

$$S = \frac{r-b}{r}$$
$$H = \frac{g-b}{r-b}$$
$$V = r$$

S and H are between 0 and 1. When S is 0, r=g=b and the color is the white; when S is 1, b is 0 and the color is most saturated. When H is 0, g=b and the color is red; when H is 1, g=b and the color is yellow.

It has been determined that skin score can be well modeled by the following equation:

$$skinScore_{RY}(H, S, V) = \begin{cases} f_{RY}(S, H) & \text{when } V \text{ is not too small or too big} \\ f_{TY}(S*k_s, H*k_H) & \text{when } V \text{ is too small or too big} \end{cases}$$

where $k_S$ and $k_H$ vary with V.

The system can use RGB to represent the above equation as:

$$skinScore = f_{RY}((r-b)*p(r), (g-b)*q(r-b)) \quad (3)$$

The above equation can be implemented by concatenation of 1D LUTs and 2D LUTs. The calculation uses one 2D LUT for $f_{RY}(\bullet,\bullet)$, and two 1D LUTs for $p(\bullet)$ and $q(\bullet)$.

Figure 6:
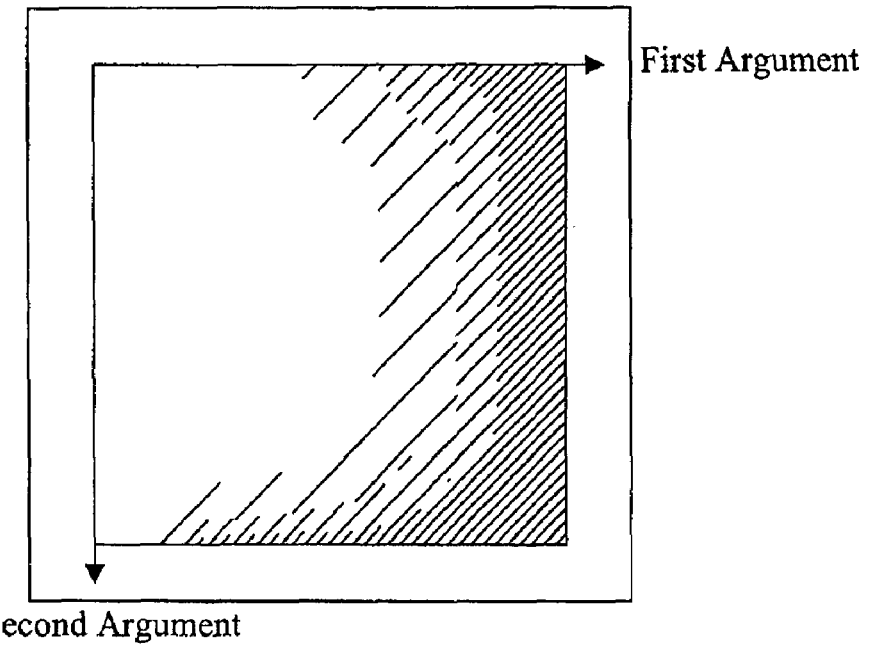
FIG. 6 illustrates a look up table for fRY.

The 2D LUT $f_{RY}(\bullet,\bullet)$ is illustrated in FIG. 6 with the x axis the first argument, the y axis the second argument, white=1; black=0, gray=between 0 and 1.

The red-magenta (red>blue>green) area 520 may be represented as follows:

$$S = \frac{r-g}{r} \quad (4)$$
$$H = \frac{b-g}{r-g}$$
$$V = r$$
$$skinScore_{RM}(H, S, V) = f_{RM}((r-g)*p(r), (b-g)*q(r-g))$$

Figure 7:
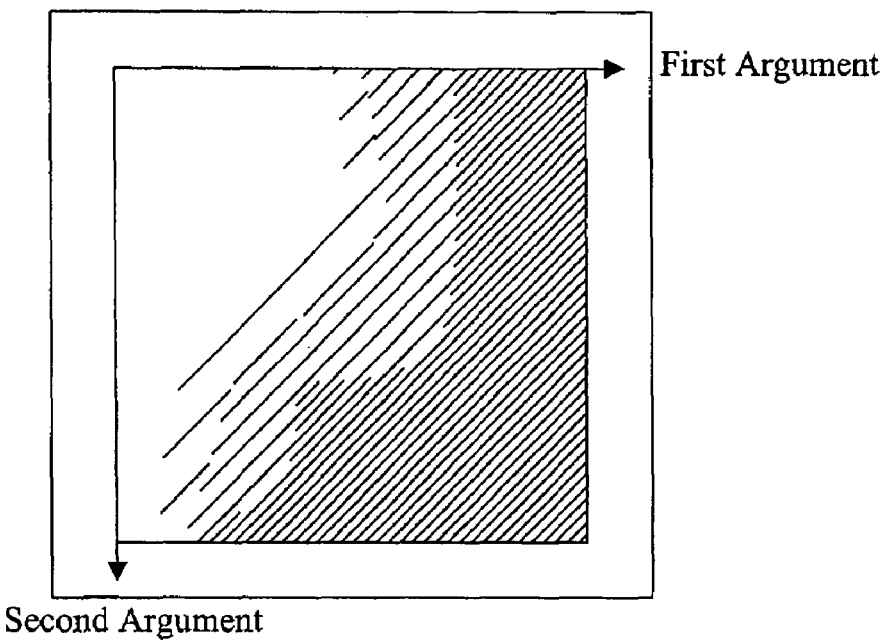
FIG. 7 illustrates a look up table for fRM.

The calculation uses a new 2D LUT for $f_{RM}(\bullet,\bullet)$ as illustrated in FIG. 7 and the same two 1D LUTs for $p(\bullet)$ and $q(\bullet)$, with the x axis the first argument, the y axis the second argument, white=1; black=0, gray=between 0 and 1.

The calculation for the blue-magenta (blue>red>green) area 530 may be defined as follows:

$$S = \frac{b-g}{g} \quad (5)$$
$$H = \frac{r-g}{b-g}$$
$$V = b$$
$$skinScore_{BM}(H, S, V) = f_{BM}((b-g)*p(b), (r-g)*q(b-g))$$

Figure 8:
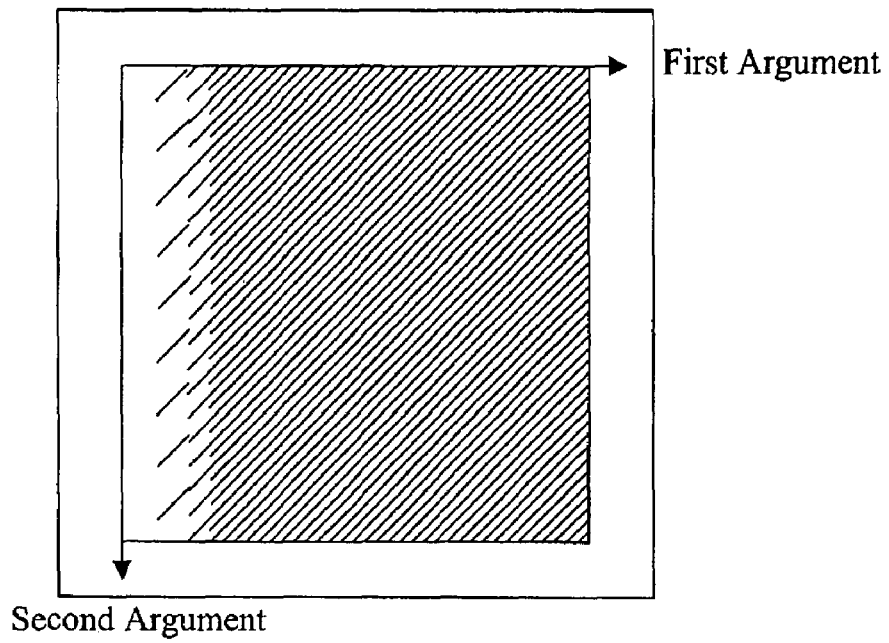
FIG. 8 illustrates a look up table for fBM.

The calculation uses a new 2D LUT for $f_{BM}(\bullet,\bullet)$ as illustrated in FIG. 8 and the same two 1D LUTs for $p(\bullet)$ and $q(\bullet)$, with the x axis the first argument, the y axis the second argument, white=1; black=0, gray=between 0 and 1.

The calculation for the blue-cyan (blue>green>red) area 540 may be characterized as follows:

$$S = \frac{b-r}{b} \quad (6)$$
$$H = \frac{g-r}{b-r}$$
$$V = b$$
$$skinScore_{BC}(H, S, V) = f_{BC}((b-r)*p(b), (g-r)*q(b-r))$$

The calculation uses a 2D LUT for $f_{BC}(\bullet,\bullet) = f_{BM}(\bullet,\bullet)$ and the same two 1D LUTs for $p(\bullet)$ and $q(\bullet)$.

The 2D LUT $f_{BC}(\bullet,\bullet)$ is illustrated in FIG. 8. In this case, $f_{BC}(\bullet,\bullet)$ and $f_{BM}(\bullet,\bullet)$ are the same with the x axis the first argument, the y axis the second argument, white=1; black=0, gray=between 0 and 1.

The calculation for the green-cyan (green>blue>red) area 550 may be characterized as follows:

$$S = \frac{g-r}{g}$$

$$H = \frac{b-r}{g-r}$$

$$V = g$$

$$skinScore_{GC}(H, S, V) = f_{GC}((g-r)*p(b), (b-r)*q(g-r))$$

(7)

The calculation uses a 2D LUT for $f_{BC}(\cdot,\cdot)=f_{GC}(\cdot,\cdot)$ and the same two 1D LUTs for $p(\cdot)$ and $q(\cdot)$.

The 2D LUT $f_{GC}(\cdot,\cdot)$ is illustrated in FIG. 8. In this case, $f_{GC}(\cdot,\cdot)$ and $f_{BM}(\cdot,\cdot)$ are the same with the x axis the first argument, the y axis the second argument, white=1; black=0, gray=between 0 and 1.

The calculation for the green-yellow (green>red>blue) area 560 may be characterized as follows:

$$S = \frac{g-b}{g}$$

$$H = \frac{r-b}{g-b}$$

$$V = g$$

$$skinScore_{GY}(H, S, V) = f_{GY}((g-b)*p(g), (r-b)*q(b-g))$$

(8)

The calculation uses a 2D LUT for $f_{BC}(\cdot,\cdot)=f_{GY}(\cdot,\cdot)$ and the same two 1D LUTs for $p(\cdot)$ and $q(\cdot)$.

Figure 9:
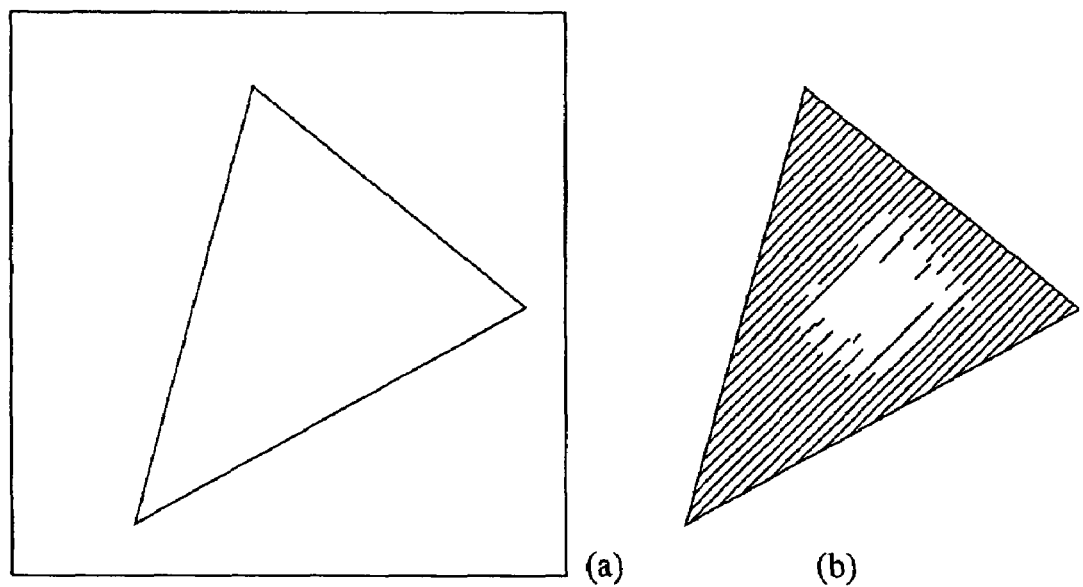
FIG. 9 illustrates a color gamut in the x-y chromaticity chart and skin scores.

The skin score for the sRGB color gamut is illustrated in 2D in FIG. 9. One may notice most skin colors are in the red-yellow and red-magenta areas and close to the white point.

Calculating skin score may use both a liner buffer and LUTs. As previously shown, the algorithm divides the color space into six color areas, and each of the six color areas uses one 2D LUT and two 1D LUTs. Because all the six color areas share the same 1D LUTs to compute $p(\cdot)$ and $q(\cdot)$, totally there are two 1D LUTs. While the red-yellow and red-magenta color areas use their own 2D LUTs, and the rest four color areas share one 2D LUTs, totally there are three 2D LUTs.

GMA0 may use two 1D LUTs for gamma correction and inverse gamma correction. The IIR filter for skin score requires one line buffer for storing previous pixels' skin scores.

One may use a filter to smooth skin score in order to prevent any potential contouring artifacts. To reduce the hardware cost, the filter is chosen as an IIR filter. Specifically, the formula is skin score(x,y)=$a_0$*skin score(x,y)+$a_1$*skin score(x−1,
y)+$a_2$*skin score(x−2,y)+$a_3$*skin score(x−2,y−
1)+$a_4$*skin score(x−1,y−1)+$a_5$*skin score(x,y−
1)+$a_6$*skin score(x+1,y−1)+$a_7$*skin score(x+2,y−
1)  (9)

where x is the row index, y is the column index, and $a_0+a_1+a_2+a_3+a_4=1$.

This IIR filter uses one line buffer for skin score, but does not require line buffers for RGB.

In order to reduce the artifacts resulting from GMA/image enhancement, a modified technique may incorporate spatial information with the GMA/color enhancement. In addition, the spatial information may be obtained using multi-channel decomposition of the image. More specifically, the preferred technique may decompose an image into multiple images. The one image may incorporate a pixel-based GMA/color enhancement technique. The color enhanced image and the non-enhanced image are then combined back into a single image.

Figure 10:
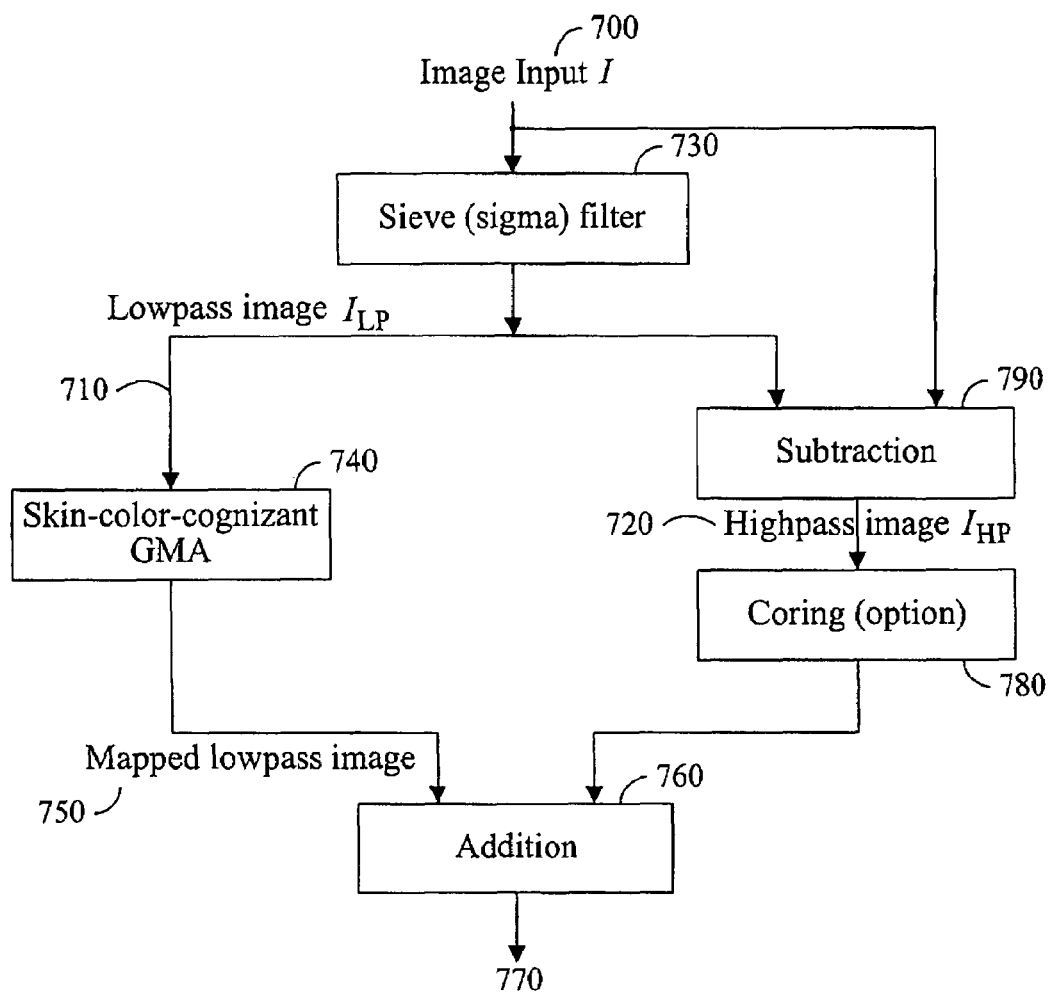
FIG. 10 illustrates a skin color-cognizant gamut mapping apparatus with two channel decomposition.

Referring to FIG. 10, specifically, the input image 700 is first decomposed into lowpass 710 and highpass 720 images by a sigma filter 730. The lowpass image, containing no details or artifacts, goes through the GMA 740. The highpass image, containing details and noise and artifacts, does not go through the GMA and will be added 760 back to the color mapped lowpass image 750 to generate the new image 770. Therefore, the noise in the highpass image 720 is not enhanced by the GMA. In addition, the highpass image 720 can go through coring 780 processing to reduce noise and artifacts.

The sigma filter 730 decomposes the input image into the lowpass and highpass images. The sigma filter was first published by Lee (J. S. Lee, "Digital image enhancement and noise filtering by use of local statistics," in *IEEE Trans. Pattern Analysis and Machine Intelligence,* Vol. PAMI-2, No. 2, pp. 165-168, March, 1980). The sigma filter utilizes a 1-D or 2-D rectangular window, where the current pixel I(x,y) is at the center of the window. The sigma filter compares all the pixels I(i,j) in the window with the central pixel I(x,y), and only averages those pixels whose value differences with the central pixel I(x,y) is within a threshold T. The sigma filter is a nonlinear filter. Mathematically, the output of the sigma filter, $I_{LP}(x,y)$, is calculated by $$I_{LP}(x, y) = \frac{\sum_{(i,j) \in E \& |I(i,j)-I(x,y)|<T} I(i, j)}{N(x, y)}$$

where E is the window; N(x,y) is the count of the pixels in E that satisfy the condition of |I(i,j)−I(x,y)|<T. The parameters of the sigma filter, the widow E and the threshold T, may be chosen empirically.

The sigma filter generates the lowpass image 710, and the highpass image 720 is obtained by subtraction 790. Because the sigma filter is a smoothing filter preserving sharp edges, the lowpass image generated by a sigma filter contains few details but contains sharp edges, and the highpass image contains details/noises/artifacts but few sharp edges. It is also to be understood that a similar technique may be used to protect skin tones when the gamut of the display is smaller than the input color gamut.

As previously noted, the advance of flat panel display (FPD) technology is able to make the color gamut of a display wider (e.g., wide color gamut) than the sRGB color gamut that is widely used by existing high definition television standards and Internet/computers standards. Also, without suitable color gamut mapping there exists a mismatch between the wide color gamut display and the sRGB-coded source content making the human skin appearance unnatural on the wide color gamut display. Therefore, it is desirable to have a skin color-cognizant color gamut mapping algorithm (GMA) that maps sRGB colors to the wide color gamut colors in order to both utilize most (if not all) of the wide color gamut and render skin colors more appropriately.

It turns out that the GMA technique may generate different resulting images based upon different input color temperatures for the particular content. For example, the input color temperature of an image sent a display may be D50 (i.e., 50,000K) while the output color temperature of the display is D65 (i.e., 65,000K). Typically within the display, an integrated circuit converts the input color temperature from D50 to D65, as set by the user or display. In the event that the GMA is logically located in the image processing flow before the color temperature adjustment integrated circuit, then the GMA is preferably designed to operate at a particular color temperature and maintains the color temperature input thereto at its output, such as from D65 to D65, or D50 to D50. In most cases, the input image has a known and consistent color temperature, such as sRGB for television content has a color temperature of D65.

It turns out that the GMA may generate a different output image based upon input image with the same content but different color temperature. This change in the characteristics of the GMA based upon color temperature is especially troubling for skin tones which the viewer expects to be generally independent of the color temperature of the display.

In the case that the GMA is alternatively located in the image processing flow after the color temperature adjustment integrated circuit, then the GMA will receive the input image with the same content but different color temperature. The GMA should maintain the overall input color temperature of the image, which may be different depending on the input image, such as from D65 to D65, or D50 to D50 while still correctly detecting the same skin color regions. In this case, the GMA may have a mapping technique that includes look up tables that are color temperature dependant. While having multiple skin score look up tables that are color temperature dependant is feasible, it results in the use of significant storage requirements within the device.

Alternatively, the GMA may convert the color temperature of the input image to a consistent color temperature, such as from D50 to D65, or D55 to D65. The resulting converted consistent color temperature image within the GMA is then processed to provide the desired output image. The output image from the GMA may then be converted back to the input color temperature of the image provided to the GMA so the overall input color temperature is not changed. Moreover, the GMA may process the image in such a manner that primarily the skin-tones of the image are protected against the effects of the changes due to different color temperatures of the GMA.

It is desirable to permit the user to adjust the skin color (hue, saturation, and/or brightness) according to their preferences while maintaining the skin tones accurately depicted.

The preferred system uses a modified GMA technique that changes the signal sent to generate the skin score to compensate for the color temperature effects. Otherwise, the GMA technique does not substantially change the signal sent to the matrix manipulation. As a result, the input and output of the skin color-cognizant GMA technique still have the same (substantially the same) color temperature while protecting the skin tones.

The adjustment of skin color is preferably based on a user-defined 3×3 matrix. The adjustment of the skin color by the user preferably does not adjust skin colors with low saturation.

Figure 11:
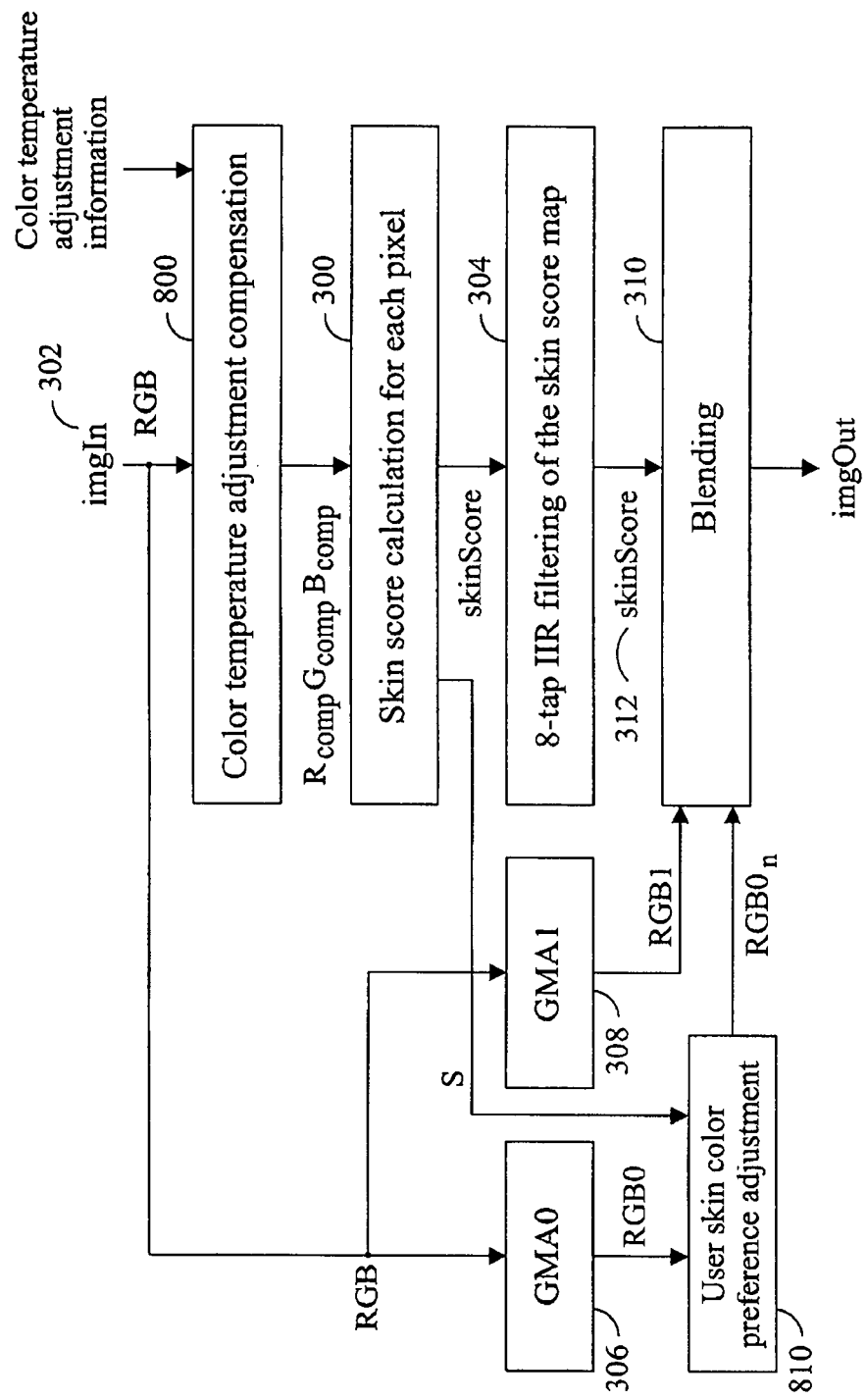
FIG. 11 illustrates a modified two channel skin color cognizant gamut mapping apparatus with color temperature compensation.
Figure 12:
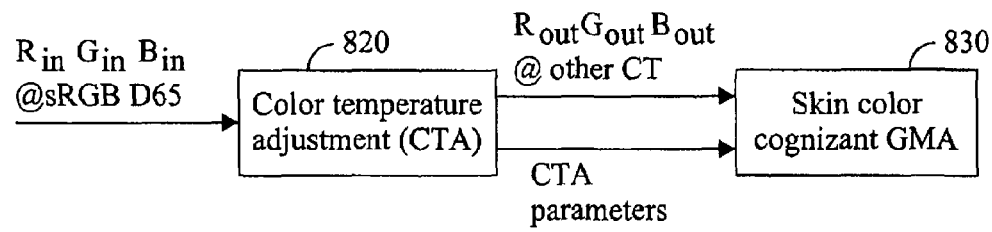
FIG. 12 illustrates relative positions of color temperature adjustment (CTA) and skin color cognizant GMA.

The overall diagram of the skin color-cognizant GMA with color temperature adjustment and skin color user preference adjustment is shown in FIG. 11. FIG. 11 includes a color temperature adjustment compensation 800 and user preference adjustment 810, as described below. As previously described, some displays are implemented in such as way that is it more convenient for the skin-cognizant GMA to be located after an integrated circuit that contains the color temperature adjustment in the signal processing chain, which is illustrated in FIG. 12. This order of operation results in skin-tone changes as a result of the GMA technique, as previously described.

The color temperature adjustment (CTA) 820 can be modeled by three independent nonlinear mapping functions for R, G, and B respectively, $R_{out}=f_r(R_{in})$ $G_{out}=f_g(G_{in})$ $B_{out}=f_b(B_{in})$ \hfill Equation (9)

Figure 13:
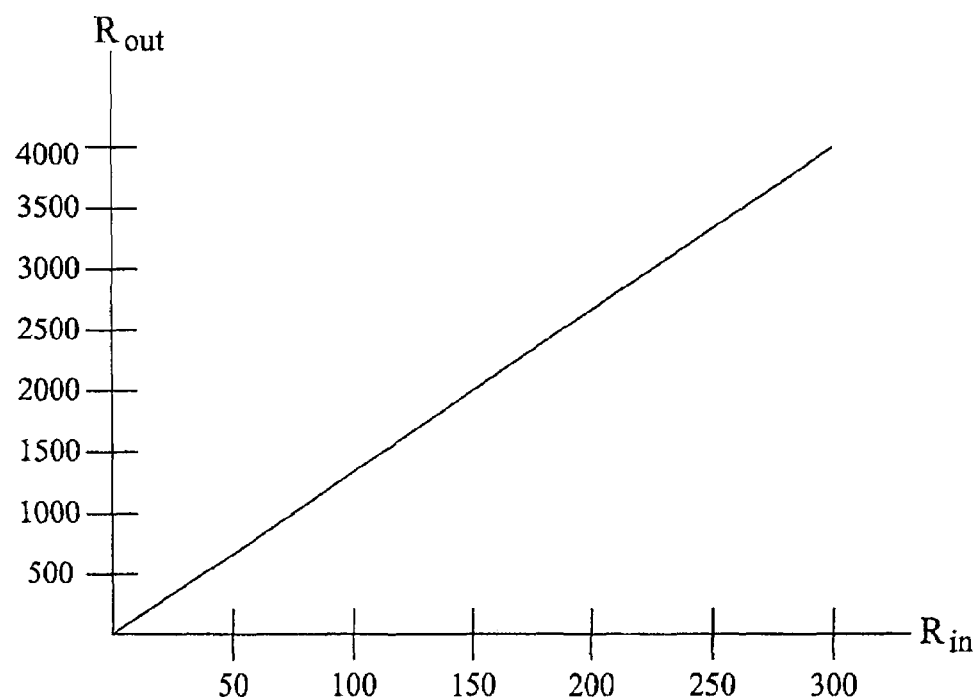
FIG. 13 illustrates a color temperature adjustment mapping function.

In practice, the above three CTA functions may be implemented by three 1-D LUTs (each color uses one) plus 1-D interpolation/extrapolation. Referring to FIG. 15, one typical example of LUTS is shown. This exemplary LUT has 6 fixed entries (8-bit) non-uniformly distributed in the 0 to 255 range. The contents are adjustable (12-bit) in the field. The CTA mapping of red defined by Table 1 is illustrated in FIG. 13.

The skin-color-cognizant GMA 830 may use the three 1-D LUTs if they are available to do the GMA compensation. The GMA compensation is to generally reverse the three CTA mapping functions defined in the three LUTs primarily for the skinScore image map calculated in the Skin score calculation for each pixel component.

There are several different implementations that may be used to achieve the reverse mapping functionality for the GMA to protect the skin tones. The first reverse mapping functionality described is a "precise" reverse mapping.

Precise Reverse Mapping

Because the CTA are three nonlinear (e.g., piecewise linear) mappings, the straightforward method is to precisely reverse the three nonlinear mappings defined by equation (9).

$R_{comp}=f_r^{-1}(R_{out})=R_{in}$ $G_{comp}=f_g^{-1}(G_{out})=G_{in}$ $B_{comp}=f_b^{-1}(B_{out})=B_{in}$ \hfill Equation (10)

The second reverse mapping functionality described is a "coarse" approximation.

Coarse Reverse Mapping

Because the precise solution (equation (10)) may difficult to implement, another technique may be used that is more computationally inexpensive to implement while being somewhat less accurate. There are two steps in this technique. First, the CTA mappings defined by equation (9) are roughly approximated by linear mappings, i.e., $R_{out} \approx h_R R_{in}$, $G_{out} \approx h_G G_{in}$, $B_{out} \approx h_B B_{in}$, \hfill Equation (11)

where $h_R$, $h_G$, $h_B$ can be approximated by picking a value in CTA LUTs and dividing it by its corresponding entry. For example, the system may select the values associated with entry=164 in FIG. 15, divide them by 164 and get $h_R=2697/164=16.4451$ $h_G=2498/164=15.2317$ $h_B=2250/164=13.7195$ Second, the system may compute $R_{comp}$, $G_{comp}$, $B_{comp}$. Given $h_R$, $h_G$, $h_B$, one can compute $$R_{comp} = R_{out}/h_R \approx R_{in},$$

$$G_{comp} = G_{out}/h_G \approx G_{in},$$

$$B_{comp} = B_{out}/h_B \approx B_{in},$$

To determine $R_{comp}$, $G_{comp}$, $B_{comp}$ the system uses divisions to derive $R_{in}$, $G_{in}$, $B_{in}$ from $R_{out}$, $G_{out}$, $B_{out}$. To avoid these divisions, one may use the characteristics of computing skinScore. Specifically, computing skinScore is a function of saturation and hue, which are determined by the ratio among R, G, and B, but not by their absolute values. For examples, for colors with R>G>B, $$\text{Saturation} = (R-B)/B,$$

$$\text{hue} = (G-B)/(R-B).$$

If R/B, R/G and B/G remain unchanged, then the above saturation and hue are unchanged, and skinScore is unchanged.

Therefore, the compensated RGB may be defined as $$R_{comp} = h_G h_B R_{out}$$

$$G_{comp} = h_R h_B G_{out}$$

$$B_{comp} = h_R h_G B_{out}.$$

For $R_{comp}$, instead of dividing $R_{out}$ by $h_R$, the system may multiply $R_{out}$ by $h_G h_B$. By using equation (11) and the above equations, one obtains $$R_{comp}/G_{comp} \approx R_{in}/G_{in},$$

$$R_{comp}/B_{comp} \approx R_{in}/B_{in},$$

$$B_{comp}/G_{comp} \approx B_{in}/G_{in}.$$

The above equations show that the ratios among $R_{comp}$, $G_{comp}$, $B_{comp}$ are approximately the same as the ratio among $R_{in}$, $G_{in}$, $B_{in}$, so saturation and hue calculated from $R_{comp}$, $G_{comp}$, $B_{comp}$ are also approximately the same as the ones calculated from $R_{in}$, $G_{in}$, $B_{in}$. As a result, skinScore calculated from $R_{comp}$, $G_{comp}$, $B_{comp}$ is the same as skinScore calculated from $R_{in}$, $G_{in}$, $B_{in}$. The influence of color temperature adjustment is corrected, and the technique is computationally less expensive by using two multiplications to replace one division.

The third reverse mapping functionality described is a "fine" approximation.

Fine Reverse Mapping

The second solution approximates the three CTA mappings as three linear mappings, and some accuracy has been lost. To improve the accuracy, the third solution approximates the three CTA mappings as three piecewise linear mappings with multiple parameters. Specifically, $$R_{out} \approx h_R(R_{out})R_{in},$$

$$G_{out} \approx h_G(G_{out})G_{in},$$

$$B_{out} \approx h_B(B_{out})B_{in},\qquad \text{Equation (12)}$$

Parameters $h_R$, $h_G$, $h_B$ change with values of $R_{out}$, $G_{out}$, $B_{out}$. As one embodiment, one calculates $h_R$, $h_G$, $h_B$ at the six points that defined in CTA LUTs. Specifically, one calculates $h_R$, $h_G$, $h_B$ by dividing the values in CTA LUTs by their corresponding entries, and build new LUTs. The new LUTs also store $R_{out}$, $G_{out}$, $B_{out}$. An example of $h_R$ LUT calculated from FIG. 15 is shown in FIG. 16.

For a $R_{out}$, one first compares $R_{out}$ with the values of $R_{out}$ stored in the above $h_R$ LUT, and find the closest one, and then obtain the corresponding $h_R(R_{out})$. The same procedure is repeated for $G_{out}$ and $B_{out}$.

Similar to the second approach, one may calculate compensated R G B from $R_{out}$ $G_{out}$ $B_{out}$ by $$R_{comp} = (h_G(G_{out})h_B(B_{out}))R_{out}$$

$$G_{comp} = (h_R(R_{out})h_B(B_{out}))G_{out}$$

$$B_{comp} = (h_R(R_{out})h_G(G_{out}))B_{out}$$

By using equation (12) and the above equations, one obtains $$R_{comp}/G_{comp} \approx R_{in}/G_{in},$$

$$R_{comp}/B_{comp} \approx R_{in}/B_{in},$$

$$B_{comp}/G_{comp} \approx B_{in}/G_{in}.$$

Again, because the ratios among $R_{comp}$, $G_{comp}$, $B_{comp}$ are approximately the same as the ratio among $R_{in}$, $G_{in}$, $B_{in}$, saturation and hue calculated from $R_{comp}$, $G_{comp}$, $B_{comp}$ are the same as from $R_{in}$, $G_{in}$, $B_{in}$, and skinScore calculated from $R_{comp}$, $G_{comp}$, $B_{comp}$ is the same as skinScore calculated from $R_{in}$, $G_{in}$, $B_{in}$. The influence of color temperature adjustment is corrected.

No matter which of the above three solutions is used (or other solutions) in the color temperature adjustment compensation 800 the color temperature adjustment compensation only affects skinScore calculation, not GMA0 and GMA1. Therefore, the color temperature of the output of the GMA 830 is still the same as the input even after the color temperature adjustment compensation 800 is included.

Figure 14:
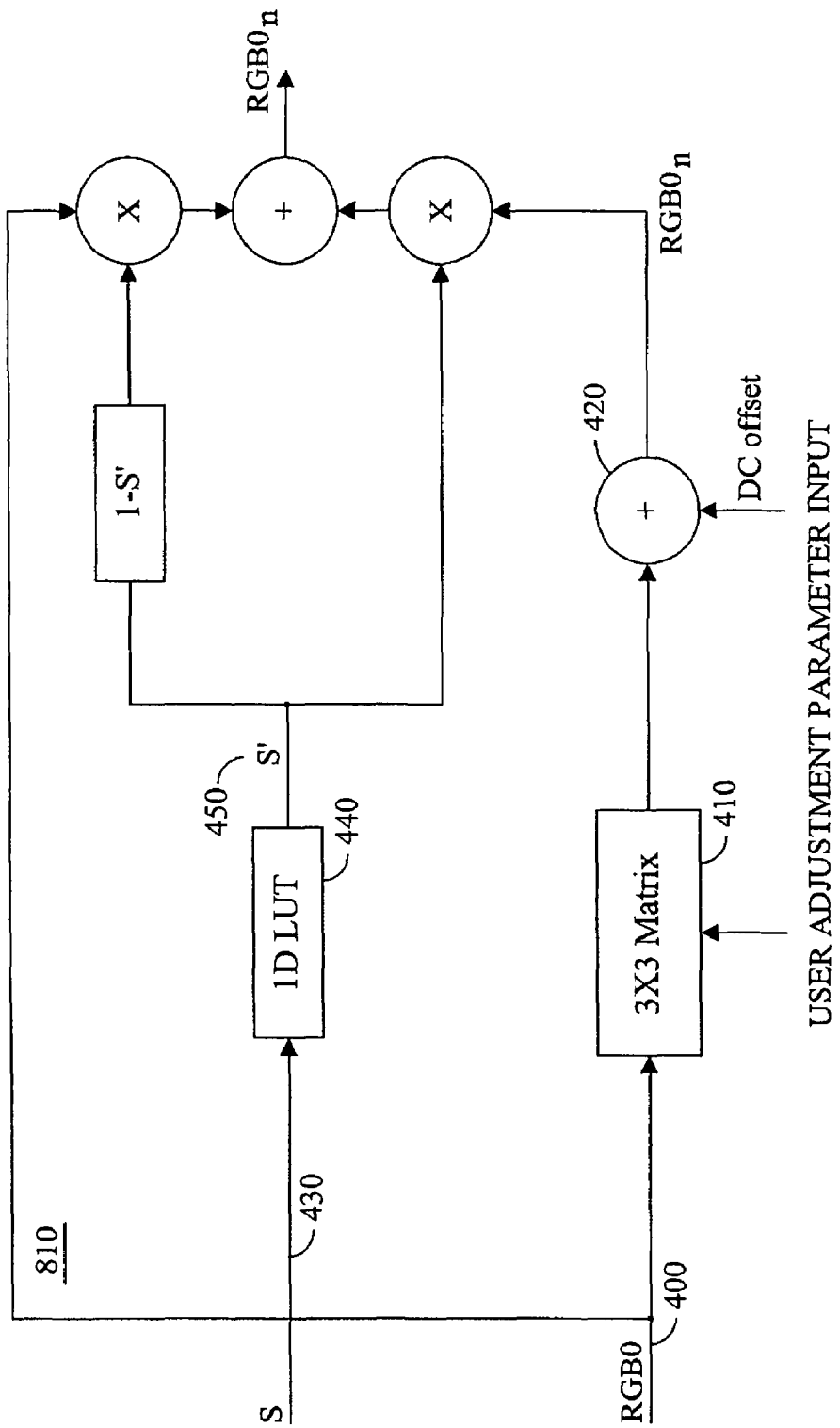
FIG. 14 illustrates a user skin color preference adjustment.

The user skin color preference adjustment 810 may be done by the algorithm illustrated in FIG. 14. The adjustment algorithm 810 reads in RGB0 400, which has been mapped to sRGB by GMA0. The RGB0 is the skin tones of the image, which generally includes skin tones, whites, and neutrals. If the user changes the skin tones using an adjustment, then it becomes more difficult to distinguish skin tones from the whites and neutrals because they are close to one another.

One technique to distinguish skin tones from whites and neutrals is based upon a realization that the whites and neutrals have a low saturation in comparison to the skin tones. The algorithm adjusts RGB0 to $RGB0_n$ by a 3×3 matrix 410 and a DC offset 420. While RGB0 preserves sRGB skin colors, the 3×3 matrix and the DC offset make $RGB0_n$ away from sRGB, thus changing the skin tones.

The 3×3 matrix 410 and the DC offset 420 are generated by users according to their preference. There are many ways for users to generate the 3×3 matrix and DC offset. As a preferred embodiment, users can adjust hue, saturation and brightness in the YCbCr space, and then the adjustment parameters are converted to a new 3×3 matrix and DC offset. In order to keep neutral colors unaffected by this preference adjustment, the algorithm also preferably uses the saturation 430 which is then modified by a look up table 440 to further separate the neutrals and whites from the skin tones to obtain a modified saturation S 450. The modified saturation 450 is used to blend RGB0 400 and $RGB0_n$ together.

$$RGB0_n = (1-S')RGB0 + S'RGB0_n$$

The blending makes the skin color with lower saturation be affected less by the 3×3 matrix and DC offset. Saturation S has already been calculated when skinScore is calculated in the "Skin score calculation for each pixel" component. Modification of S can be done by a 1-D LUT to S' or using other mechanisms.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for modifying an image to be displayed on a display comprising:
    (a) receiving with a processor an image calibrated to a first color gamut generally smaller than the color gamut of said display;
    (b) filtering with said processor said image with a spatial filter to define regions including generally skin-tones in such a manner that the skin-tone regions of the image are modified in a manner different than generally non-skin-tone regions of said image are modified when displayed on said display;
    (c) modifying with said processor a color temperature of said filtered image;
    (d) displaying said color temperature modified filtered image on said display.

2. The method of claim 1 wherein said filtering does not change the color temperature of said received image.

3. A method for modifying an image to be displayed on a display comprising:
    (a) receiving with a processor an image calibrated to a first color gamut generally smaller than the color gamut of said display;
    (b) modifying with said processor a color temperature of said received image;
    (c) filtering with said processor said color temperature modified image with a filter that varies based upon said modified color temperature to define pixels including generally skin-tones in such a manner that the skin-tone pixels of the image are modified in a manner different than generally non-skin-tone pixels of said image are modified when displayed on said display;
    (d) displaying said filtered image on said display.

4. A method for modifying an image to be displayed on a display comprising:
    (a) receiving with a processor an image calibrated to a first color gamut generally smaller than the color gamut of said display;
    (b) modifying with said processor a color temperature of said received image;
    (c) filtering with said processor said color temperature modified image with a spatial filter to define regions including generally skin-tones in such a manner that the skin-tone regions of the image are modified in a manner different than generally non-skin-tone regions of said image are modified when displayed on said display;
    (d) displaying said filtered image on said display.

5. The method of claim 4 wherein said filtering of said skin-tone regions varies based upon said color temperature of said modified image.

6. The method of claim 4 wherein said filtering of said non-skin-tone regions varies based upon said color temperature of said modified image.

7. The method of claim 4 wherein said skin-tone regions are defined by a spatial low pass filter.

8. The method of claim 4 wherein said filtered image includes edges.

9. The method of claim 4 wherein said filtered image is defined using a edge preserving low pass filter.

10. The method of claim 4 wherein said spatial filter includes a region defined around a pixel of interest.

11. The method of claim 10 wherein said spatial filter determines pixels within said region that are sufficiently similar to said pixel of interest.

12. The method of claim 4 wherein said filtering includes a look-up table to further define said skin-tone regions.

13. The method of claim 4 wherein said filtering includes a spatial characteristics that determines whether proximate pixels have said skin-tones.

14. The method of claim 4 wherein said filtering includes a color space characteristic that determines if proximate pixels have said skin-tones.

15. The method of claim 4 wherein said image is separated into a base image and a residual image, said base image is said filtered and said residual image includes said higher frequency content.

16. The method of claim 4 wherein said lower frequency content is separated by edges.

17. The method of claim 4 wherein said higher frequency content includes high frequency details, noise, and artifacts.

18. The method of claim 4 wherein said filter includes a threshold.

19. The method of claim 4 wherein said threshold is based upon the content of said image.

20. The method of claim 4 wherein said filtering includes
    (a) modifying said image with a first gamut mapping to a first color gamut;
    (b) modifying said image with a second gamut mapping to a second color gamut, wherein said second color gamut is generally different than said first color gamut;
    (c) determining potential skin-tone pixels of said image;
    (d) modifying said image based upon said first gamut mapping, said second gamut mapping, and said potential skin-tone pixels.

21. The method of claim 20 wherein said first gamut mapping leaves said image substantially unchanged.

22. The method of claim 20 wherein said second gamut mapping substantially changes said image to match that of an input image calibration.

23. The method of claim 20 wherein said second color gamut is generally larger than said first color gamut.

24. The method of claim 20 wherein said potential skin-tone pixels are filtered with a color spatial filter.

25. The method of claim 20 wherein said first gamut mapping is independent of skin-tones.

26. The method of claim 20 wherein said second gamut mapping is independent of skin-tones.

27. The method of claim 20 wherein the values associated with said potential skin-tone pixels are non-binary.

28. The method of claim 20 wherein said potential skin-tone pixels may be modified based upon a gain.

29. The method of claim 20 wherein said potential skin-tone pixels are color temperature adjusted.

30. The method of claim 29 wherein said color temperature adjustment is based upon the said modified color temperature.

31. The method of claim 20 wherein said first gamut mapping is adjusted in a manner that distinguishes between generally skin tones and generally at least one of generally white and generally neutral color.

32. A method for modifying an image to be displayed on a display comprising:
(a) receiving with a processor an image calibrated to a first color gamut generally smaller than the color gamut of said display;
(b) modifying with said processor a color temperature of said received image;
(c) filtering with said processor said received image with a filter to define pixels including generally skin-tones in such a manner that the skin-tone pixels of the image are modified in a manner different than generally non-skin-tone pixels of said image are modified when displayed on said display, wherein said filtering is also performed in such a manner that said skin-tone pixels and said non-skin tone pixels are filtered in a different manner that accounts for color temperature;
(d) displaying said filtered image on said display.

33. The method of claim 32 wherein said filtering is based upon said color temperature modified image.

34. The method of claim 32 wherein said modifying is based upon said filtered image.

35. The method of claim 32 wherein said color temperature filtering adjusts the hue of the displayed image.

36. The method of claim 32 wherein said color temperature filtering distinguishes skin tones from at least one of whites and neutrals.

* * * * *

UNITED STATES PATENT AND TRADEMARK OFFICE
CERTIFICATE OF CORRECTION

PATENT NO. : 8,050,496 B2
APPLICATION NO. : 11/895854
DATED : November 1, 2011
INVENTOR(S) : Hao Pan and Scott J. Daly Page 1 of 1

It is certified that error appears in the above-identified patent and that said Letters Patent is hereby corrected as shown below:

Col. 5, Line 64

Change:

$$skinScore_{RY}(H,S,V) = \begin{cases} f_{RY}(S,H) & \text{when } V \text{ is not too small or too big} \\ f_{TY}(S^*k_S.H^*k_H) & \text{when } V \text{ is too small or too big} \end{cases}$$

to read:

$$skinScore_{RY}(H,S,V) = \begin{cases} f_{RY}(S,H) & \text{when } V \text{ is not too small or too big} \\ f_{RY}(S^*k_S.H^*k_H) & \text{when } V \text{ is too small or too big} \end{cases}$$

Col. 7, Line 11

Change: $skinScore_{GC}(H,S,V) = f_{GC}((g-r)^*p(b),(b-r)^*q(g-r))$ to read: $skinScore_{GC}(H,S,V) = f_{GC}((g-r)^*p(g),(b-r)^*q(g-r))$

Col. 7, Line 29

Change: $skinScore_{GC}(H,S,V) = f_{GY}((g-b)^*p(g),(r-b)^*q(b-g))$ to read: $skinScore_{GC}(H,S,V) = f_{GY}((g-b)^*p(g),(r-b)^*q(g-b))$ Signed and Sealed this
Thirty-first Day of July, 2012

David J. Kappos
*Director of the United States Patent and Trademark Office*